Patented July 22, 1941

2,250,182

UNITED STATES PATENT OFFICE 2,250,182

FIRE FOAM PRODUCING COMPOSITION

Ernest F. Goodner and Frederick W. Dittus, Berkeley, Calif., assignors to Standard Oil Company of California, San Francisco, Calif., a corporation of Delaware No Drawing. Application September 18, 1939, Serial No. 295,456

6 Claims. (Cl. 252—7)

This invention relates to a novel composition of matter useful for producing fire foam, and particularly to such composition which, in the form of a powder, when mixed with water or aqueous solution, will form a foam suitable for extinguishing fires and preventing the spreading thereof, especially such fires as may occur in oil storage.

Fire foams have been generated by mixing aluminum sulfate and sodium bicarbonate with water in the presence of such foam stabilizers as licorice root extract, butylnaphthalene sulfonate, oak bark extract, etc. However, the fire foams made in accordance with processes prior to this invention do not satisfactorily fulfill the requirements of an effective fire foam, especially for use in combating such fires as occur in oil storage.

We have discovered that by the use of certain ether acids or the alkali metal salts thereof, including the ammonium salts, as foam augmenting and stabilizing agents, particularly in combination with such chemicals as aluminum sulfate and sodium bicarbonate which react in water to produce carbon dioxide and a gelatinous precipitate, such as aluminum hydroxide, a superior fire foam can be produced when the foam augmenting and stabilizing agents of this invention are mixed with foam generating chemicals to form a fire foam producing composition. The fire foam powder made in accordance with this invention is found to have the desirable characteristic of initiating foam production rapidly, but the duration of reaction of the powder in producing the foam extends over a period of time long enough to enhance the stability of the foam formed. It converts a given quantity of water to a relatively large volume of foam and does so with a relatively small quantity of powder. It is effective to produce foam over a relatively wide range of ratios of water to powder, is effective in sea water as well as in fresh water, and is relatively insensitive to the presence of some contaminating oil in the water used. Moreover, the foam produced in accordance with this invention has a relatively long life, a relatively low drainage of water therefrom, a high resistance to being broken down when contacted by a water stream and can be built up by a high pressure, high velocity water stream when such a stream beats air into the foam body, even when partially dried and shrunken from long standing, has a high resistance to a relatively high temperature flame, good heat insulating properties, fluidity, can be spread out over a horizontal surface and will flow down over and cling to a vertical surface, can be reunited in case of a break in the foam layer, can be passed through a substantial length of a discharge line, such as a hose, without breaking down and without creating a high back pressure, and can be readily washed with water from surfaces upon which deposited.

It is accordingly one object of this invention to make a novel composition of matter capable of producing an improved fire foam having the characteristics described above.

It is another object of this invention to make a novel composition of matter in the form of a powder which, when mixed with water or an aqueous solution, will produce a foam suitable for extinguishing and preventing the spreading of fire.

Other further and important objects of this invention will be apparent to those skilled in the art to which it relates from the following description and appended claims.

The ether acids employed in the present invention as foam augmenting and stabilizing agents are wetting agents having the general formula R—O—R'—COOH, in which R is an alkyl, aryl, aralkyl, or cyclic non-benzenoid group and R' is an aliphatic group or alkylene radical and are effective to reduce the surface tension of water. Generally, the ether acids are more suited to the purposes of the present invention when the group R contains from two to twelve carbon atoms and the group R' from one to seven carbon atoms, but it is preferred that the number of carbon atoms in group R and group R' together be at least as great as six and that the carboxyl group of the ether acid be close to the ether-oxygen, preferably on the alpha or beta position with respect to the ether-oxygen. Ether acids in which the group R and the group R' contain more than these respective numbers of carbon atoms per molecule and which are effective to reduce the surface tension of water may also be used. These ether acids are substantially colorless liquids and their salts may be readily crystallized. Some of these ether acids are described in U. S. Patent No. 1,920,137.

A fire foam powder made up in accordance with the following formula and containing the preferred agent is illustrative of this invention:

| | Parts by weight |
|---|---|
| Aluminum sulfate | 57 |
| Sodium bicarbonate | 43 |
| Sodium salt of alkoxy acetic acid ($ROCH_2COONa$ where R is an alkyl group having from 5 to 10 carbon atoms) | 1.5 |
| Anticaker | 3 |

The aluminum sulfate and sodium bicarbonate are used in substantially stoichiometrical proportions. The ether acid here used is in liquid form, and it is sprayed into the powdered chemicals, preferably into the aluminum sulfate alone, since this avoids lumping, and the acid is absorbed thereby so that it is thoroughly mixed into the powder. Any substantial quantity of water present in the ether acid should be evaporated therefrom before being added, to prevent a premature reaction of the aluminum sulfate and sodium bicarbonate. An anticaker is desirable and any well known anticaker may be used, such as chalk, talc, magnesium stearate, china clay, etc., but it is preferred to use the anticaker disclosed in the copending application, Serial No. 296,289, filed September 23, 1939, of Ernest F. Goodner, because not only does the anticaker disclosed in this application function as an anticaker but also it cooperates with the ether acids of this invention to produce a better fire foam.

Other ether acids or alkali metal (including ammonium) salts thereof, which may be used for the purposes of this invention are heptoxybutyric, ethoxyacetic, n-octyloxyacetic, cyclohexoxybutyric, amyloxybutyric, heptoxyacetic, xylenoxyacetic, and beta-butoxyethoxyacetic acid. Mixtures of these ether acids or their alkali metal salts are also effective. These mixtures may be prepared by condensing mixtures of alcohols, which may be prepared synthetically from carbon monoxide and hydrogen, with chlorine substituted fatty acids or with unsaturated acids. Alkoxyacetic acids obtained by condensing chloracetic acid with aliphatic alcohols having a boiling range of 147-157° C., or with the alcohols boiling from 155-195° C. are particularly effective.

Aluminum sulfate and sodium bicarbonate have been disclosed herein as examples of chemicals which react in water to produce carbon dioxide and gelatinous precipitate, but this invention is not limited thereto since any chemicals which produce a gas and preferably also a gelatinous precipitate, such as aluminum hydroxide, upon reacting in water can be used, such as ferric sulfate and sodium carbonate, and oxalic acid and sodium bicarbonate, for examples.

As an explanation of the functioning of the foam augmenting and stabilizing agents of this invention the following points may be considered; however, it is to be distinctly understood that our invention is not limited by the accuracy of any theoretical explanation, since the novel product of our invention is effective and useful regardless of any such explanation. When a bubble of gas forms in a liquid and rises to the surface, the top of the gas bubble acts as a spherical wedge and raises the surface of the liquid directly above the bubble. As this liquid at the surface is raised, there is a tendency for it to flow downward over the upper surface of the gas bubble. If the force tending to hold the surface layer of the liquid together is not great enough, the gas bubble forces itself through the surface of the liquid, breaks it and the bubble no longer exists. If, on the other hand, there is a force great enough to hold the liquid surface together, such surface will have a sufficient tensile strength and the gas bubble will lift some of the liquid surface up with it, forming a bubble. This bubble will then not be broken down unless the forces tending to separate or stretch the film of which the bubble is composed, such as the force due to the internal pressure of the gas therein, are great enough to overcome the force due to the tensile strength of this film. The size of the bubble formed depends to some extent on the surface tension of this film, since the bubble will expand until the surface tension and force due to internal pressure balance. If other bubbles are formed under and about the one bubble, a foam is produced.

The substances which we have added to the foam powder of this invention as foam augmenting and stabilizing agents are compounds whose molecules have hydrophilic heads and hydrophobic tails of such balanced effectiveness that when added to water are positively adsorbed on the surface so that there is a difference in concentration between the surface and the interior of the aqueous solution. When these substances are adsorbed on the water surface and a bubble rises to the surface, the tendency for the surface layer to flow downward over the upper surface of the bubble is opposed by the force due to the difference in concentration at the surface from the concentration in the body of aqueous solution. Thus the tensile strength of the surface film is increased and the bubbles formed tend to accumulate and form a foam. It therefore appears that the foam augmenting and stabilizing agents of this invention tend to create or produce a sufficient tensile strength in the surface film to form bubbles and foam because these substances are adsorbed on the surface of the water to which they are added.

Since adsorption on the water surface so as to create a difference in concentration of the foam augmenting and stabilizing agent between the surface and the sub-surface layers reduces the surface tension of the liquid, reduction in surface tension may be regarded as a measure of the adsorption on the surface, and therefore also as a criterion of the effectiveness of any particular ether acid or alkali metal salt thereof, regardless of the number of carbon atoms in the molecule, except that the preferred number of carbon atoms are as pointed out above. It has been found that the agents of this invention are effective to substantially reduce the surface tension of the aqueous solution resulting when the carbon dioxide and gelatinous precipitate producing chemicals react and are effective to do this whether the water used is fresh water or sea water. The value of the surface tension of the aqueous solution resulting from the reaction of approximately stoichiometrical proportions of the aluminum sulfate and sodium bicarbonate in water in a ratio of water to powder of 10/1, when reduced by the agents of this invention at a concentration of the agent of 0.2% by weight of the solution, was found to be at least 45 dynes per centimeter measured by the DuNouy tensiometer at 20° C.

There is another factor with regard to the production or increase of tensile strength in a bubble film caused by the agents used in accordance with this invention. The hydrophilic heads and hydrophobic tails of the molecules of the compounds used are thought to be attracted or held together because of an interlacing of the hydrophobic tails, or by some other physical or chemical force between the tails or heads or between each other. Moreover, the gelatinous precipitate, such as aluminum hydroxide, appears to cooperate with the molecules of the agent in this respect to augment the foam and to increase the stability of the foam produced. It is also thought that the adsorbed layer of agent reduces the rate of evaporation from the sub-layer of aqueous solution and that the molecules of the agent having hydrophobic tails and hydrophilic heads cooperate with the gelatinous precipitate, such as aluminum hydroxide, to form a relatively stable film structure, thus contributing to the stability of the foam produced.

It has been found that very small proportions of the foam augmenting and stabilizing agent of this invention can be used with effectiveness. The minimum proportion which is effective for any particular agent may vary with the particular agent or agents used, but in all cases the minimum proportion was found to fall within the range of 0.1 to 0.8% by weight of the mixture of carbon dioxide and gelatinous precipitate producing chemicals, such as aluminum sulfate and sodium bicarbonate, and the agent. The actual minimum percentage which is effective for any particular agent or agents can be readily ascertained by a simple preliminary test. It has also been found that proportions of the agent of this invention as high as about 7% can be used to advantage for the purposes of this invention; however, the preferred optimum range lies between 1 and 2½ per cent.

When the foam powder of this invention is mixed with water to form foam it is preferred to use a ratio of water to powder in the range from 15/1 to 10/1 by weight. However, it has been found to be a significant feature of this invention that good foam can be produced over a wide range of the ratio of water to powder by weight, for instance, from about 18/1 to about 6/1. The greater the proportion of water used the more fluid is the foam and in general the greater the drainage of water therefrom on standing, and lowering the proportion of water tends to reduce the fluidity of the foam and decrease the water drainage.

In using the foam powders made in accordance with this invention, it was found that when these powders are injected into a water stream the initial foam formation is sufficiently rapid to provide a relatively large quantity of foam in a very short period of time. When the foam powders are injected into a 2½" pipe carrying a stream of water at the rate of 7 gallons per minute conversion to a satisfactory foam will be produced in the flowing stream at a distance as short as 12 feet from the point of injection. This rapid initiation of the production of foam from the powders made in accordance with this invention appears to be due to some kind of interaction between the foam augmenting agent and the carbon dioxide and gelatinous precipitate producing chemicals as the powder is introduced into the water. It is not known just what this interaction is but it appears that the initial foam production is rapid even though the agents themselves are slow to dissolve in water alone. It is thought that the agitation resulting from the production of carbon dioxide may aid the agents in being effective for the purpose of this invention, even though the agents are very slow to dissolve in water alone.

The foam powders of this invention work in fresh water and in sea water, and in either fresh water or sea water the volume of foam produced is relatively large. The volume of foam produced in sample tests in which 10 grams of powder containing 1-2½% by weight of the agent was mixed into 150 c. c. of sea water at room temperature in a 1000 c. c. tapered graduate (about 10½ inches high, 5 inches top inside diameter and 1½ inches bottom inside diameter) was from 700-900 c. c. After allowing such foams to stand for about 30 seconds and then stirring somewhat vigorously (about 60 times in one minute) by hand with a wooden rod about ½" in diameter for about one minute, there was in many cases no water drainage at all and no cases of water drainage in excess of 50 c. c.

It was found that the effectiveness of the foam powder of this invention was not substantially detrimentally affected, except for some diminution in volume of foam produced, by crude oil in the water in proportion by volume about 2 per cent. To test this about 2 per cent by volume of crude oil was added to the sea water in to which the foam powder was mixed. The volume of foam produced was decreased in some cases about 20%, but the quality was not substantially detrimentally affected.

The foams formed have been found to retain their fire resistant and fire extinguishing qualities for a relatively long period of time. This is especially important for such a foam is likely to endure for the whole time of a fire and, since it does not break down rapidly, less foam is required to replace any that has broken down. Tests showed that after standing for three hours on the ground in the open air, although the volume had decreased somewhat the foam had not deteriorated appreciably in other fire extinguishing characteristics, especially with regard to resistance to high temperature flame. After five hours some of the foams were further decreased in volume but could be revived by beating air and water into them by means of a high pressure hose stream. Upon standing for a day or two the foam was considerably shrunken and dried out but it would still float upon gasoline and could be partially revived with a high pressure hose stream.

It is an important feature of this invention that when the foams produced from the powders of this invention are placed on the ground or on the surface of oil and contacted with a high velocity, high pressure water stream, they do not break down but actually build up when the water stream beats air into the foam body. The resulting foam may be wetter and more fluid but still retains its fire extinguishing characteristics, especially for extinguishing an oil fire.

The foams were tested for fire resistant properties in the following manner: A small quantity, about 5 c. c., of paint thinner (a heavy gasoline) was placed in the bottom of a 400 c. c. evaporating dish. The dish was then filled with foam above the paint thinner and placed upon a clay triangle supported by a ring stand. A large flame of a Fisher burner was directed straight down onto the middle of the foam surface, the lower edge of the burner being about 2½ inches above the foam surface. The time required for the flame to ignite the paint thinner under the foam is a measure of the fire resistance of the foam. This value varied from about 10 to 20 minutes, depending on the agent selected and the ratio of water to powder. In general, an increase of the proportion of water with respect to the powder within the preferable range of 10 to 15 of water to one of powder tends to increase the fire resistance of the foam.

The foams when used to extinguish a test fire were found to flow over the oil surface and other surfaces effectively blanketing and starving the fire. They flow down and cling to vertical surfaces and spread thereover to form a blanket. When a layer of foam upon gasoline was intentionally parted and the exposed gasoline ignited, the foam around the break flowed together to reunite the foam layer and extinguish the gasoline fire. When the foam powders are injected into a 2½" discharge hose carrying a stream of water at the rate of 85 gallons per minute, the foams produced can be transmitted through 200 feet in length of such a hose without breaking down and without developing a back pressure high enough to interfere with a satisfactory feed of powder into the water line.

Although the ether acids effective as foam augmenting and stabilizing agents of this invention may be used when the chemicals, such as aluminum sulfate and sodium bicarbonate, are in solution, numerous advantages and unexpected results are due to the use of these ether acids in a foam powder as such. Since these agents are effective in a relatively small proportion by weight of the foam powder, such agents present in such small proportions do not lower the effectiveness of the carbon dioxide and gelatinous precipitate producing chemicals as much as known foam stabilizing agents which must be present in larger proportions. Consequently, a sufficient proportion of anticaking materials can be added without decreasing the effectiveness of the aforementioned chemicals too much and without making it necessary to use aluminum sulfate having fewer molecules of water, such as, for example, 12 or 14, instead of the commercial aluminum sulfate which contains 18 molecules of water. Furthermore, it appears that the agents of this invention themselves aid in the retardation or prevention of caking of the powder. Aluminum sulfate is rather granular and has to be carefully sized in order that it feed properly in many of the old foam powders known prior to this invention because they contain a relatively large proportion of a relatively sticky material as a foam stabilizer. The agents of this invention are required in only a relatively small proportion and therefore, even if somewhat sticky themselves, do not render the powder containing them sticky because of the relatively small proportion of such agents incorporated into the powder. Moreover, it is thought that the organic part of the molecules of the agents used may have a lubricating effect in the powder which assists the powder in flowing properly into the water stream when being used. The agents of this invention which are hygroscopic tend to pick up any water that may be present in the powder, thus acting to dry the powders when in sealed containers and also tending to retard or prevent caking due to a premature reaction which liberates water and carbon dioxide in the powder. Many of the stabilizers known prior to this invention have a tendency to ferment in the presence of moisture, but the agents of this invention do not ferment and therefore, the powder does not deteriorate because of fermentation of the agent even if some moisture is present. When foam powders containing stabilizers available prior to this invention which have been stored in an air-tight container are opened for use, they tend to become sticky, but the foam powders of this invention do not show this tendency, probably due to the small proportion of the agent present or to the fact that the agents themselves do not become sticky when exposed to moisture in the atmosphere.

As a modification of this invention the foam augmenting and stabilizing agent may be incorporated into either one alone or both of the carbon dioxide and gelatinous precipitate producing chemicals and the chemicals mixed at the time of use. In such case the two powders could be stored in separate containers and mixed when required for extinguishing a fire.

Although we have, for the purpose of illustrating and explaining our invention, disclosed specific carbon dioxide and gelatinous precipitate producing chemicals and a number of specific organic compounds effective as foam augmenting and stabilizing agents, specific proportions of the agent in the powder and specific ratio ranges of water to powder, numerous specific characteristics of the foam powder of this invention and of the foam produced therefrom, our invention is not limited thereby, but comprehends variations and modifications within the scope of the appended claims.

We claim:

1. A fire foam powder comprising a mixture of aluminum sulfate and sodium bicarbonate which react in water to produce carbon dioxide and a gelatinuous precipitate and a foam augmenting and stabilizing agent comprising an organic compound selected from the group consisting of ether acids having a general formula

R—O—R'—COOH where R is a member of the group consisting of alkyl, aryl, aralkyl, and cyclic non-benzenoid chemical groups and R' is an aliphatic group and the alkali metal salts of said ether acids.

2. A fire foam powder as defined in claim 1 in which R contains from two to ten carbon atoms per molecule and R' has from one to seven carbon atoms per molecule.

3. A fire foam composition comprising substantially stoichiometrical proportions of aluminum sulfate and sodium bicarbonate, and from 1 to 2.5 per cent by weight of a sodium salt of an al-alkoxyacetic acid having the general formula R—O—CH$_2$—COONa where R is an alkyl group having from five to ten carbon atoms per molecule.

4. A fire foam producing composition comprising a mixture of aluminum sulfate and sodium bicarbonate and a stabilizer for foam produced selected from the group consisting of ether acids having the general formula R—O—R'—COOH where R is a member of the group consisting of alkyl, aryl, aralkyl, and cyclic non-benzenoid chemical groups containing from two to ten carbon atoms per molecule and R' is an aliphatic group containing from one to seven carbon atoms per molecule and in which the number of carbon atoms in group R and in group R' is at least six and the ether-oxygen is close to the carboxyl group, and the alkali metal salts thereof.

5. A foam producing agent consisting of a mixture of aluminum sulfate, sodium bicarbonate and a sodium salt of an alkoxyacetic acid effective to substantially reduce the surface tension of water.

6. A fire foam producing charge consisting of two substances, respectively containing aluminum sulfate and sodium bicarbonate which when mixed in liquid phase produce a foam, one of said substances containing an agent effective to augment and stabilize said foam comprising an organic compound selected from the group consisting of ether acids having the general formula R—O—R'—COOH where R is a member of the group consisting of aliphatic, aromatic, aralipatic and hydroaromatic organic groups containing from two to ten carbon atoms per molecule and R' is an aliphatic group containing from one to seven carbon atoms per molecule, and the alkali metal salts thereof.

ERNEST F. GOODNER.
FREDERICK W. DITTUS.